United States Patent
Chang et al.

(10) Patent No.: US 10,601,238 B2
(45) Date of Patent: Mar. 24, 2020

(54) CHARGING APPARATUS AND CHARGING CONTROL CIRCUIT THEREOF AND CHARGING CONTROL METHOD

(71) Applicant: RICHTEK TECHNOLOGY CORPORATION, Zhubei, HsinChu (TW)

(72) Inventors: Wei-Hsu Chang, New Taipei (TW); Ta-Yung Yang, Taoyuan (TW); Chih-Yuan Hsu, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 630 days.

(21) Appl. No.: 15/390,511

(22) Filed: Dec. 25, 2016

(65) Prior Publication Data
US 2017/0310122 A1    Oct. 26, 2017

Related U.S. Application Data

(60) Provisional application No. 62/326,269, filed on Apr. 22, 2016.

(51) Int. Cl.
*H02J 7/00* (2006.01)

(52) U.S. Cl.
CPC ............ *H02J 7/007* (2013.01); *H02J 7/0045* (2013.01); *H02J 7/0052* (2013.01); *H02J 2007/0059* (2013.01); *H02J 2007/0062* (2013.01)

(58) Field of Classification Search
CPC ........ H02J 7/007; H02J 7/0045; H02J 7/0052; H02J 2007/0059; H02J 2007/0062
USPC ........................................................ 320/107
See application file for complete search history.

(56) References Cited

U.S. PATENT DOCUMENTS

| | | | |
|---|---|---|---|
| 2009/0009141 A1 | 1/2009 | Li | |
| 2014/0239885 A1 | 8/2014 | Yang | |
| 2016/0218528 A1* | 7/2016 | Sugeno | H02J 7/0014 |
| 2016/0276842 A1* | 9/2016 | Shizuno | H01M 10/44 |
| 2016/0294021 A1* | 10/2016 | Ueno | H01M 10/443 |

* cited by examiner

*Primary Examiner* — Nathaniel R Pelton
(74) *Attorney, Agent, or Firm* — Tung & Associates

(57) ABSTRACT

The present invention provides a charging apparatus, a charging control circuit, and a charging control method. The charging apparatus includes a power conversion circuit for generating a DC output voltage and charging a battery by a DC output current, and a charging control circuit for controlling the power conversion circuit. When the DC output voltage or the battery voltage rises to a first reference threshold voltage, the DC output current is adjusted downward by a current down step, and when the DC output voltage or the battery voltage falls to a second reference threshold voltage, the DC output current is adjusted upward by a current up step.

19 Claims, 5 Drawing Sheets

CHARGING APPARATUS AND CHARGING CONTROL CIRCUIT THEREOF AND CHARGING CONTROL METHOD

CROSS REFERENCE

The present invention claims priority to U.S. 62/326,269, filed on Apr. 22, 2016.

BACKGROUND OF THE INVENTION

Field of Invention

The present invention relates to a charging apparatus. Particularly it relates to a charging apparatus capable of performing multi-step constant current charging. The present invention also relates to a charging control circuit and a charging control method of the charging apparatus.

Description of Related Art

FIG. 1 shows illustrative voltage and current waveforms of a prior art charging method which charges a battery with multi-step constant current levels. During charging operation, every time when the battery voltage (VBAT0) rises to a threshold voltage, this prior art adjusts the charging current (Icharge) one step lower, and then charges the battery with a constant current having the lowered level. This process is repeated until the charging current is adjusted to a predetermined minimum level.

FIG. 2 shows a block diagram of a charging apparatus (charging apparatus 1) corresponding to the prior art charging method of FIG. 1. The charging apparatus 1 includes a charger circuit (a power conversion circuit 30), a battery 20 and a load 40, wherein the output current IDC of the charger circuit supplies the charging current IBAT to the battery and the load current ILOAD at the same time. That is, IBAT=IDC−ILOAD. As shown in FIG. 3, for example when the load current ILOAD (not shown in FIG. 3) suddenly increases, the gap between the charging current IBAT for the battery and the output current IDC becomes larger, that is, the charging current IBAT becomes smaller and hence leads to a voltage drop of the battery voltage VBAT0 as shown at the time point t1 in FIG. 3. However, because the charging current has been adjusted lower previously, and the adjustment of charging current levels is unidirectional, the prior art of FIG. 1 has a drawback that the required charging time for the battery to become fully charged is prolonged under such circumstance.

Compared to the prior art in FIG. 1, the present invention has an advantage that the charging apparatus provides multi-step charging current levels which are bi-directionally adaptively adjustable, such that when the battery voltage is too low during constant current charging operation, the charging current level can be adaptively adjusted upward, to reduce the charging time.

SUMMARY OF THE INVENTION

From one perspective, the present invention provides a charging apparatus, configured to operably charge a battery, comprising: a power conversion circuit, configured to operably convert an input power to a DC (Direct Current) output power to charge the battery, wherein the DC output power includes a DC output voltage and a DC output current and the battery has a battery voltage; and a charging control circuit, including: a first comparison circuit, configured to operably compare the DC output voltage or the battery voltage with a first reference voltage threshold to generate a first comparison result; a second comparison circuit, configured to operably compare the DC output voltage or the battery voltage with a second reference voltage threshold to generate a second comparison result; and a conversion control circuit, configured to operably generate a conversion control signal for controlling the power conversion circuit to charge the battery with the DC output current; wherein in accordance with the first comparison result, when the battery voltage rises to the first reference voltage threshold, the conversion control circuit controls the power conversion circuit to adjust the DC output current downward by a current down step such that the DC output current has an adjusted-down current level and to charge the battery by the adjusted-down current level as a constant charging current; wherein in accordance with the second comparison result, when the battery voltage falls to the second reference voltage threshold, the conversion control circuit controls the power conversion circuit to adjust the DC output current upward by a current up step such that the DC output current has an adjusted-up current level and to charge the battery by the adjusted-up current level as a constant charging current.

In one embodiment, the charging control circuit further includes a third comparison circuit configured to operably compare the DC output current with a reference current threshold to generate a third comparison result; wherein in accordance with the third comparison result, when the DC output current is adjusted to be lower than the reference current threshold, the conversion control circuit controls the power conversion circuit to charge the battery by a constant voltage charging mode according to a constant target voltage.

In one embodiment, the charging control circuit further includes a current step determining circuit which determines the current up step according to a difference between the output voltage or the battery voltage and the second reference voltage threshold.

In one embodiment, the charging control circuit further includes a current step determining circuit which determines the current up step according to a load current.

In one embodiment, the charging control circuit further includes a current step determining circuit which determines the current up step according to a battery current.

In one embodiment, the current up step is not larger than the current down step.

In one embodiment, the charging apparatus of claim further includes: a cable configured to be coupled to the power conversion circuit, wherein the cable has a power line configured to be coupled to the DC output power; and a first connector, configured to couple the battery to the power line.

In one embodiment, the charging apparatus of claim further includes: a second connector, configured to couple the DC output power to power line.

In one embodiment, the charging apparatus of claim further includes: a switch, configured to operably control the conduction between the DC output power and the power line; wherein the charge control circuit further includes a switch control circuit which controls the switch to be ON during a direct charging mode for conducting the DC output power to charge the battery.

In one embodiment, the switch control circuit determines whether to enter the direct charging mode according to the battery voltage or the DC output voltage.

In one embodiment, the cable is a USB (Universal Serial Bus) or USB PD (Universal Serial Bus Power Delivery) cable; and the first connector and the second connector are USB or USB PD connectors.

From another perspective, the present invention provides a charging control circuit, configured to operably control a charging apparatus, wherein the charging apparatus comprises: a power conversion circuit, configured to operably convert an input power to a DC output power to charge the battery, wherein the DC output power includes a DC output voltage and a DC output current and the battery has a battery voltage; the charging control circuit including: a first comparison circuit, configured to operably compare the DC output voltage or the battery voltage with a first reference voltage threshold to generate a first comparison result; a second comparison circuit, configured to operably compare the DC output voltage or the battery voltage with a second reference voltage threshold to generate a second comparison result; and a conversion control circuit, configured to operably generate a conversion control signal for controlling the power conversion circuit to charge the battery with the DC output current; wherein in accordance with the first comparison result, when the battery voltage rises to the first reference voltage threshold, the conversion control circuit controls the power conversion circuit to adjust the DC output current downward by a current down step such that the DC output current has an adjusted-down current level and to charge the battery by the adjusted-down current level as a constant charging current; wherein in accordance with the second comparison result, when the battery voltage falls to the second reference voltage threshold, the conversion control circuit controls the power conversion circuit to adjust the DC output current upward by a current up step such that the DC output current has an adjusted-up current level and to charge the battery by the adjusted-up current level as a constant charging current.

From another perspective, the present invention provides a charging control method, comprising steps of: S1: controlling a power conversion circuit to provide a DC output current to charge a battery; S2: detecting an output voltage of the power conversion circuit or a battery voltage of the battery; when the output voltage or the battery voltage rises to a first reference voltage threshold, adjusting the DC output current downward by a current down step such that the DC output current has an adjusted-down current level, and charging the battery by the adjusted-down current level as a constant charging current; and S3: when the output voltage or the battery voltage falls to a second reference voltage threshold, adjusting the DC output current upward by a current up step such that the DC output current has an adjusted-up current level, and charging the battery with the adjusted-up current level as a constant charging current.

In one embodiment, the charging control method further includes: repeating step S2 and/or S3, until the DC output current is adjusted to be lower than a reference current threshold.

In one embodiment, the charging control method further includes: when the DC output current is adjusted to be lower than the reference current threshold, controlling the power conversion circuit to charge the battery by a constant voltage charging mode according to a constant target voltage.

In one embodiment, the step S3 further includes: determining the current up step according to a difference between the output voltage or the battery voltage and the second reference voltage threshold.

In one embodiment, the current up step is not larger than the current down step.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
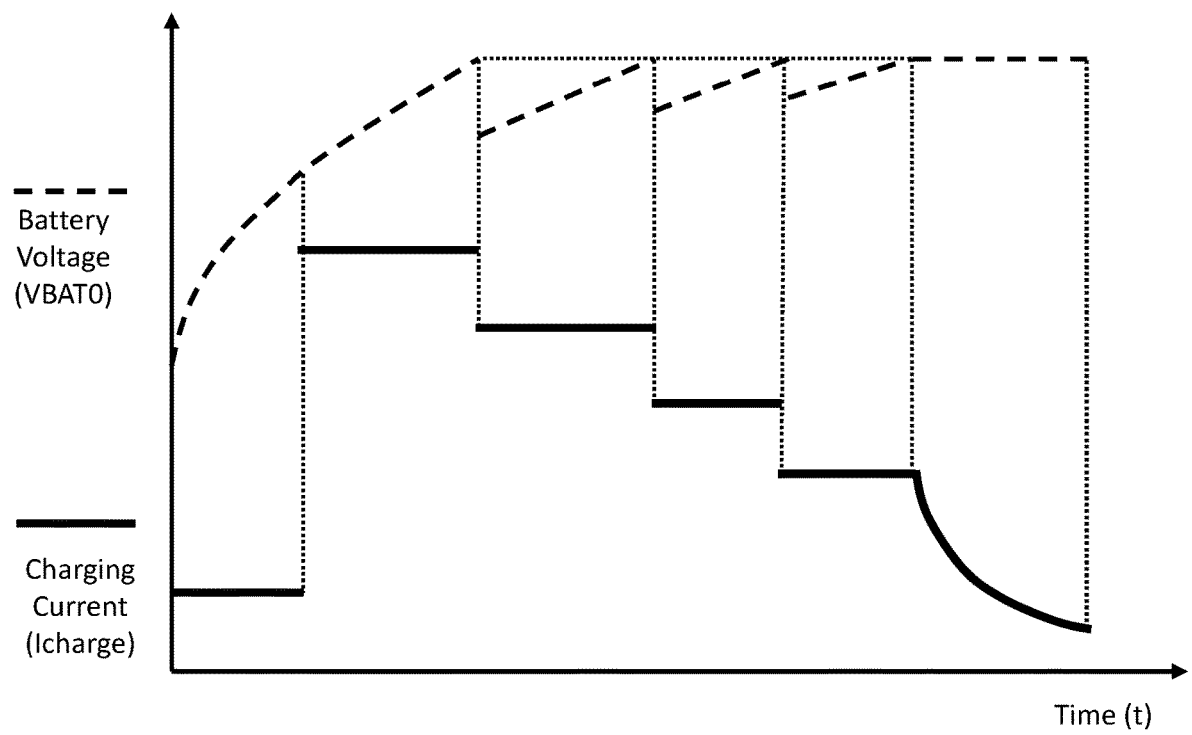
FIG. 1 shows illustrative waveforms of a prior art charging method.
Figure 2:
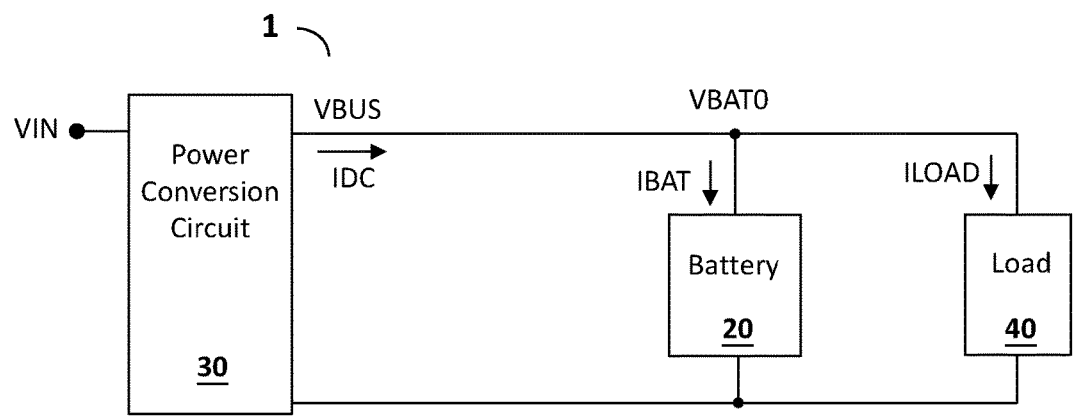
FIG. 2 shows a block diagram of a charging apparatus (charging apparatus 1) corresponding to the prior art charging method of FIG. 1.
Figure 3:
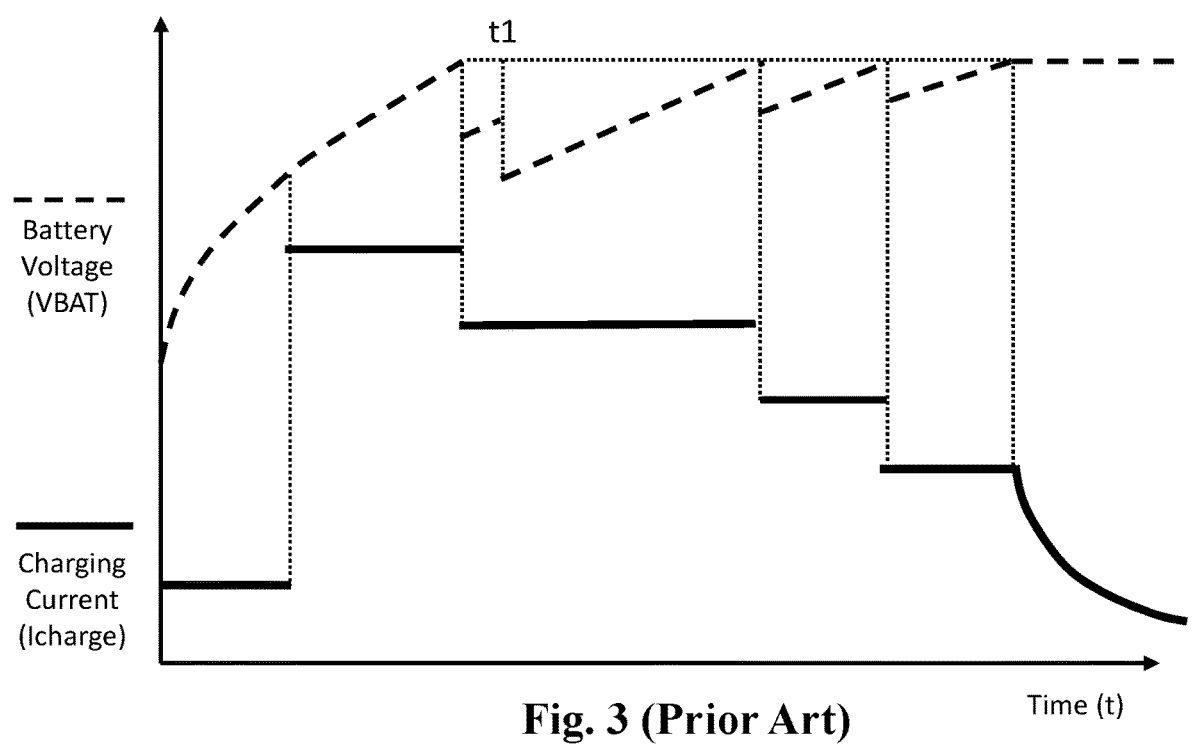
FIG. 3 shows illustrative waveforms of the prior art charging method.
Figure 4A:
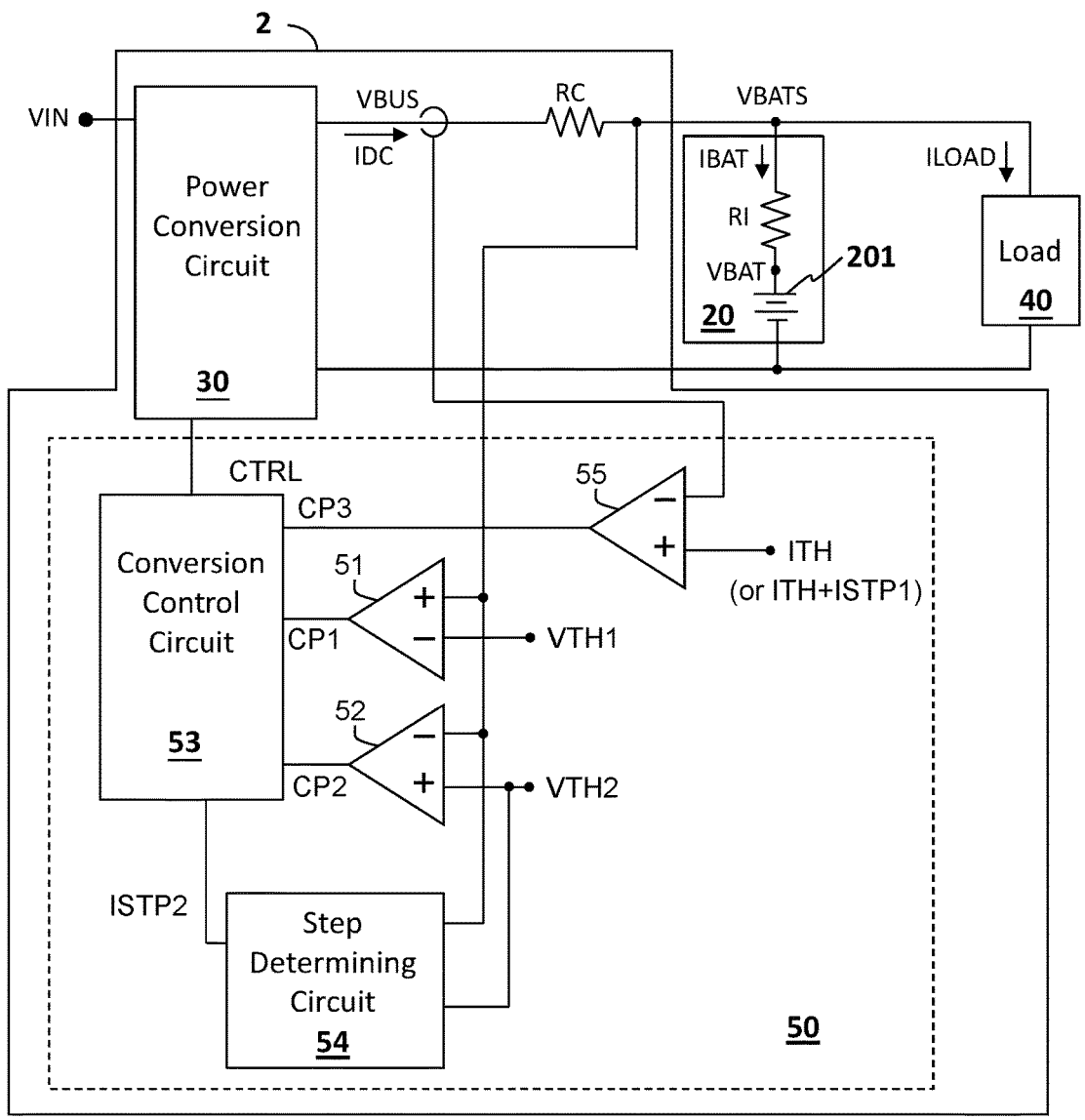
FIG. 4A shows a block diagram of an embodiment of the charging apparatus according to the present invention.
Figure 4B:
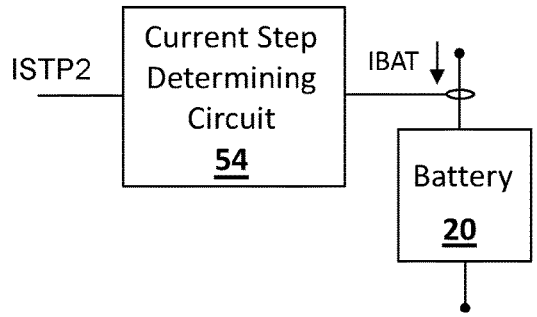
FIGS. 4B and 4C show two embodiments of the current step determining circuit.
Figure 4C:
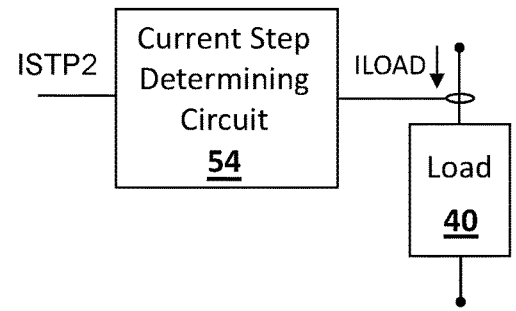

FIG. 4 shows one embodiment of a charging apparatus according to the present invention (charging apparatus 2). The charging apparatus 2 includes a power conversion circuit 30 and a charging control circuit 50, configured for operably charge a battery 20, wherein the battery 20 may be for example but not limited to a single battery, or a battery pack. The battery 20 may be regarded as, equivalently, including a power storage core 201 and a battery inner resistance RI (the battery inner resistance RI includes for example but not limited to an inner resistance corresponding to the single battery or the battery pack, or a total of the overall resistance related to the battery 20, such as including the resistance of the current sensing resistor). In charging operation, the battery 20 has a battery current IBAT, an external terminal voltage (referred to as "battery voltage" hereinafter) VBATS, and there is a voltage across the power storage core 201 (referred to as "battery inner voltage" VBAT hereinafter). Besides, FIG. 4A also shows a parasitic charging resistor RC between the DC (Direct Current) output voltage VBUS and the battery voltage VBATS; the parasitic charging resistor RC stands for, equivalently, the parasitic resistance caused by the conduction line(s), the connector(s), and the switch(es) on the charging path.

The power conversion circuit 30 is configured to operably convert an input power VIN (which may be a DC power source or an AC power source) to a DC output power to charge a battery 20, wherein the DC output power includes a DC output voltage VBUS and a DC output current IDC. The charging control circuit 50 includes a first comparison circuit 51, a second comparison circuit 52, and a conversion control circuit 53. The first comparison circuit 51 compares the battery voltage VBATS and a first reference voltage threshold VTH1 and generates a first comparison result CP1.

The second comparison circuit 52 compares the battery voltage VBATS and a second reference voltage threshold VTH2 and generates a second comparison result CP2. The conversion control circuit 53 generates a conversion control signal CTRL according to the battery voltage VBATS to control the power conversion circuit 30 for charging the battery 20 with the DC output current IDC to achieve multi-step constant current charging. The conversion control signal CTRL may determine the target of for example but not limited to the DC output voltage VBUS, the battery voltage VBATS, the battery inner voltage VBAT, the DC output current IDC, and/or the battery current IBAT.

More specifically, in accordance with the first comparison result CP1, when the battery voltage VBATS rises to the first reference voltage threshold VTH1, the conversion control circuit 53 controls the power conversion circuit 30 to adjust the DC output current IDC downward by a current downward-adjustment step ("current down step" hereinafter) step ISTP1 such that the DC output current has an adjusted-down current level and to charge the battery 20 with the adjusted-down current level as a constant charging current. And, in accordance with the second comparison result CP2, when the battery voltage VBATS falls to the second reference voltage threshold VTH2, the conversion control circuit 53 controls the power conversion circuit 30 to adjust the DC output current IDC upward by a current upward-adjustment step ("current up step" hereinafter) ISTP2 such that the DC output current has an adjusted-up current level and to charge the battery 20 with the adjusted-up current level as a constant charging current. (Details will be described with reference to FIG. 5 later)

In one embodiment, the charging apparatus 2 is only coupled to the battery 20 and does not supply power to other power-consuming devices. Under such circumstance, the DC output current IDC is substantially equal to the battery current IBAT. In another embodiment, the battery 20 is coupled to a load 40 as shown in FIG. 4A; under such circumstance the DC output current IDC is equal to the battery current IBAT plus the load current ILOAD, i.e., IBAT=IDC–ILOAD. When the load 40 consumes more power and the load current ILOAD is relatively higher, the battery voltage VBATS will drop, and there is a significant gap between the charging current IBAT obtained by the battery 20 and the DC output current IDC of the charging circuit 30, that is, the actual charging current IBAT is significantly smaller than a the DC output current IDC and hence the charging time is prolonged. The charging apparatus of the present invention can adaptively adjust the DC output current IDC upward by detecting the battery voltage VBATS, to compensate the drop of battery voltage VBATS caused by for example but not limited to the increase of the load current ILOAD, so as to effectively shorten the charging time.

Figure 5:
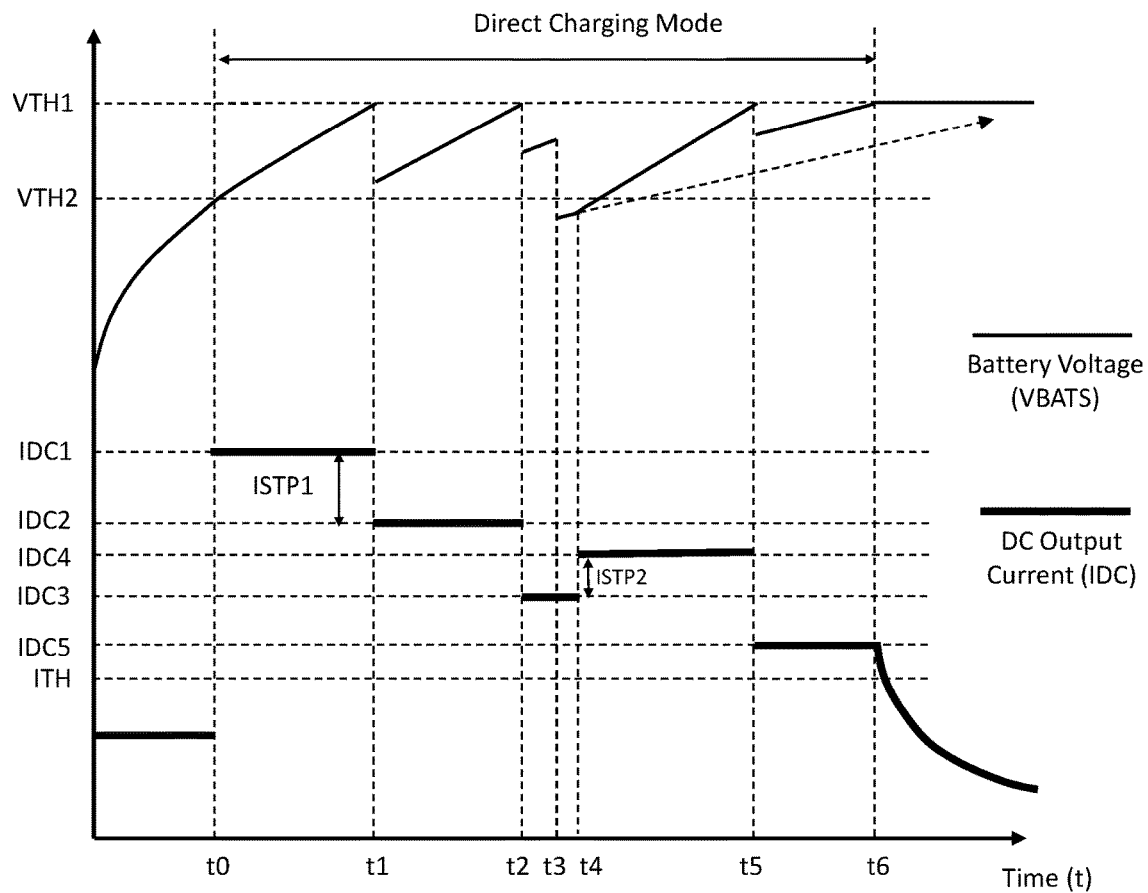
FIG. 5 shows illustrative waveforms corresponding to the charging apparatus according to the present invention in FIG. 4A.

FIG. 5 shows illustrative waveforms corresponding to the charging apparatus according to the present invention in FIG. 4A. From the time point t0 to just before the time point t1, the power conversion circuit 30 charges the battery 20 by a constant current of a level of IDC1. At the time point t1, the battery voltage VBATS rises to the first reference voltage threshold VTH1, so the DC output current IDC is adjusted downward by a current down step ISTP1 such that the DC output current has an adjusted-down current level IDC2. From the time point t1 to just before the time point t2, the power conversion circuit 30 charges the battery 20 by a constant current of a level of IDC2. At the time point t2, the battery voltage VBATS rises to the first reference voltage threshold VTH1 again after being charged with the constant current of the level of IDC2; therefore, the DC output current IDC is adjusted downward by the current down step ISTP1 again such that the DC output current has an adjusted-down current level IDC3. From the time point t2 to just before the time point t3, the power conversion circuit 30 charges the battery 20 with a constant current of a level of IDC3. At the time point t3, for example the load current ILOAD significantly increases, causing the battery voltage VBATS to drop lower than the second reference voltage threshold VTH2, so the DC output current IDC is adjusted upward by a current up step ISTP2 such that the DC output current has an adjusted-up current level IDC4. From the time point t4 to just before the time point t5, the power conversion circuit 30 charges the battery 20 by a constant current of a level of IDC4.

In FIG. 5, an extended dashed arrow can be obtained according to the rising slope of the battery voltage VBATS from the time point t3 to t4, which shows that the battery voltage VBATS requires a long time to rise to the first reference voltage threshold VTH1 if the battery 20 is charged by the current level of IDC3. However, the present invention adjusts the DC output current IDC upward by a current up level ISTP2 and charges the battery 20 by the adjusted-up current level of IDC4, which greatly reduces the charging time.

Please note the followings. In the aforementioned embodiments, the adjustment of the charging current levels is determined according to the battery voltage VBATS. However when the parasitic resistance of the charging path or the battery (i.e. the RC or RI in FIG. 4A) is negligible or known, the battery voltage VBATS, the DC output voltage VBUS and the battery inner voltage VBAT are substantially equal or have a known interrelationship. Under such circumstance, the charging apparatus of the present invention also can determine to adjust the DC output current IDC according to the DC output voltage VBUS or the battery inner voltage VBAT. For example, in FIG. 4A, the circuits 51, 52 and 54 may be considered as being coupled to the left side of the parasitic resistance RC, instead of the right side. That is, the battery voltage can be controlled to achieve the goals of the present invention no matter according to the battery voltage VBATS, the DC output voltage VBUS or the battery inner voltage VBAT. Hence, these three can be considered equivalent to one another.

Note that the aforementioned current down step ISTP1 may be a fixed value, or an adjustable variable. For example, the level of ISTP1 adjusted from IDC1 to IDC2 may be different from the level of ISTP1 adjusted from IDC2 to IDC3.

Also the aforementioned current up step ISTP2 may be a fixed value, or an adjustable variable. Referring to FIG. 4A, in one embodiment, the charging control circuit 50 further includes a current step determining circuit 54 which can determine the current up step ISTP2 according to a difference between the battery voltage VBATS or the DC output voltage VBUS and the second reference voltage threshold VTH2. In another embodiment, the current step determining circuit 54 can determine the current up step ISTP2 according to the battery current IBAT (referring to FIG. 4B). In another embodiment, the current step determining circuit 54 can determine the current up step ISTP2 according to the load current ILOAD (referring to FIG. 4C). Further, in order to avoid useless fake voltage on the battery when charging, in one embodiment, the current up step ISTP2 is preferably not larger than the current down step ISTP1.

In one embodiment, the charging control circuit 50 further includes a third comparison circuit 55 which compares the DC output current IDC and a reference current threshold ITH, or compares the DC output current IDC and a reference current threshold ITH plus a current down step ISTP1 to generate a third comparison result CP3. The charging control circuit 50 determines whether to stop the constant current charging mode (i.e. the direct charging mode) and switch to a constant voltage charging mode according to the third comparison result CP3. In the embodiment wherein the DC output current is compared with the reference current threshold ITH, when the DC output current IDC is smaller than reference current threshold ITH, or in the embodiment wherein the DC output current is compared with the reference current threshold ITH plus the current down step ISTP1, when the DC output current IDC after one more current downward adjustment will be smaller than the reference current threshold ITH (for example but not limited to the level IDC5 just before the time point t6, as shown in FIG. 5), the conversion control circuit 53 will determine a constant charging voltage level (for example but not limited to the level VTH1 at the time point t6, as shown in FIG. 5) according to the third comparison result CP3, with or not with reference to the battery voltage VBATS at that time, and will control the power conversion circuit 30 to charge the battery 20 in the constant voltage charging mode according to the constant charging voltage level.

Figure 6:
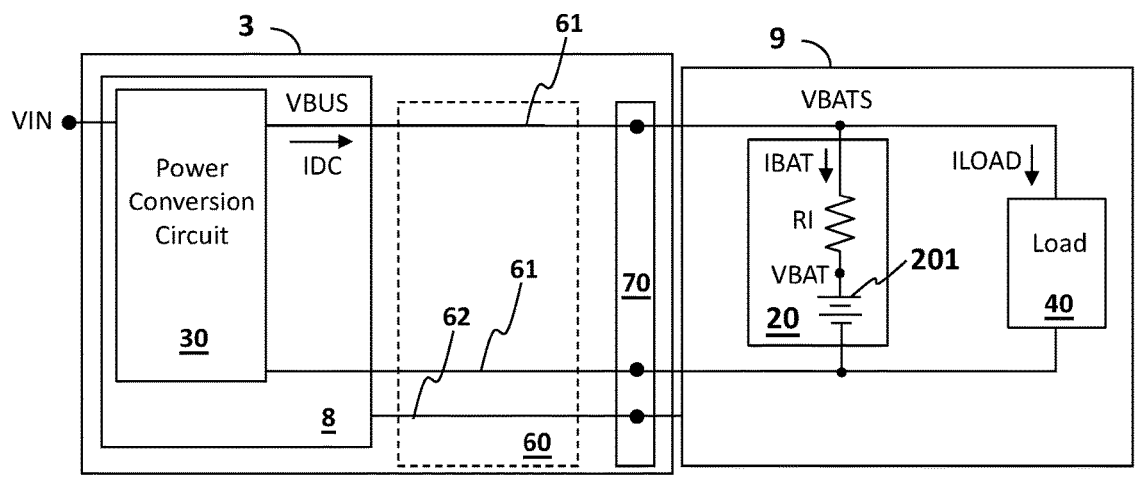
FIG. 6 shows a block diagram of an embodiment of the charging apparatus according to the present invention.

Referring to FIG. 6, in one embodiment, the charging apparatus of the present invention (charging apparatus 3) is a separable device, which may be for example but not limited to a travel adaptor (corresponding to the power conversion circuit 30 in FIG. 6) which is connected to a battery of a smartphone (corresponding to the battery 20 in FIG. 6) or a stand-alone battery (corresponding to the battery 20 in FIG. 6) to charge it. As shown in the figure, in this case, the charging apparatus 3 further includes a cable 60 (for example but not limited to a Universal Serial Bus (USB) or Universal Serial Bus Power Delivery (USB PD) cable) and a first connector 70. The DC output power is coupled to the first end of the positive and negative power lines 61 of the cable 60; the second end of the power lines 61 is coupled to the battery via the first connector 70. Besides, the travel adaptor and the power receiving circuit 9 can communicate with each other via one or plural data lines 62 (one is shown for simplification of the figure) of the cable 60.

Figure 7:
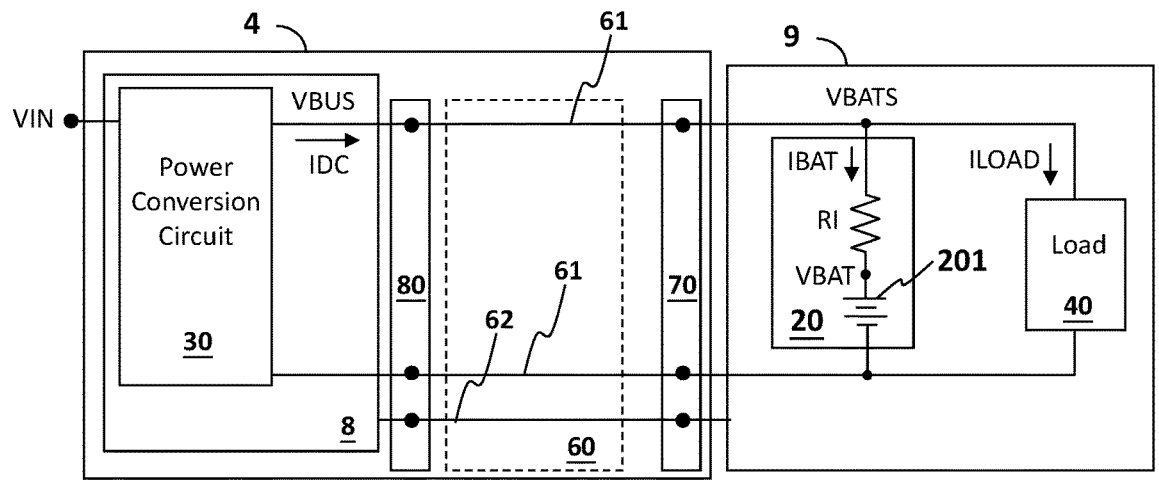
FIG. 7 shows a block diagram of an embodiment of the charging apparatus according to the present invention.

Referring to FIG. 7, in one embodiment, the cable of the charging apparatus of the present invention (charging apparatus 4) is a separable cable. In this embodiment, the charging apparatus 4 further includes a second connector 80 for coupling the power conversion circuit 30 to the cable 60, wherein the DC output power is coupled to the power line 61 via the connector 80.

Figure 8:
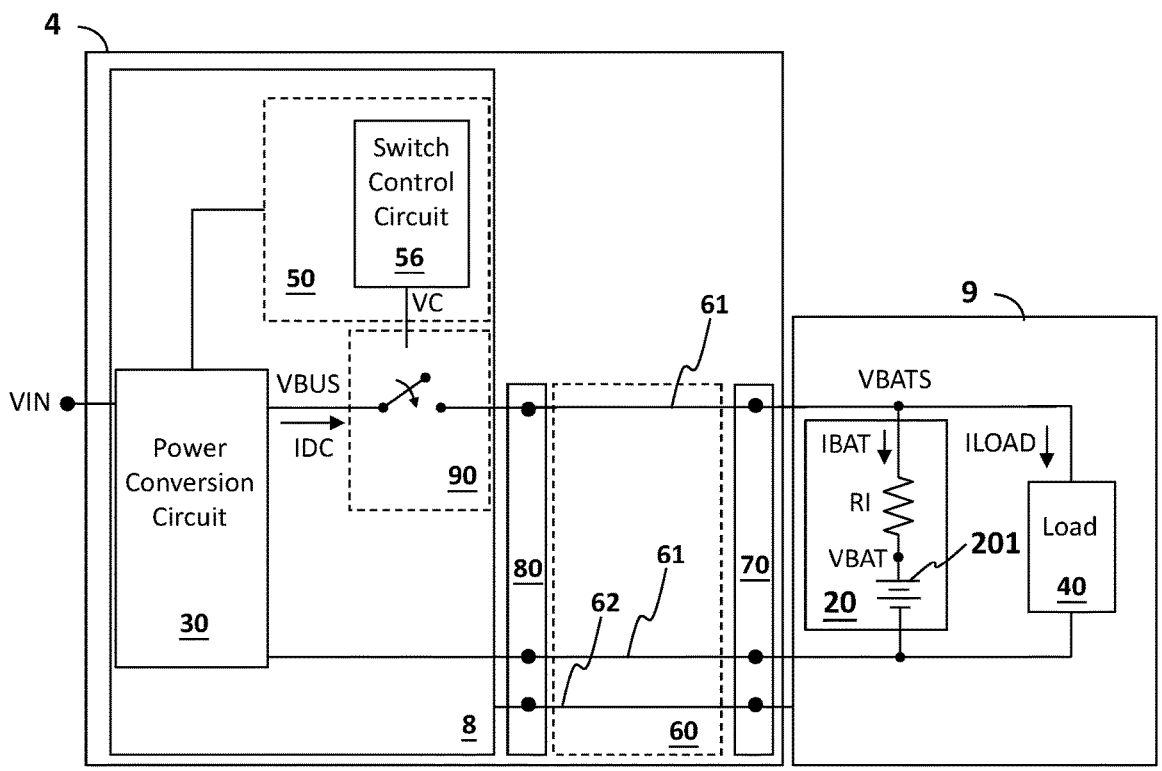
FIG. 8 shows a block diagram of an embodiment of the charging apparatus according to the present invention.

Referring to FIG. 8, in one embodiment, the charging apparatus of the present invention (charging apparatus 5) further includes a switch 90, wherein a first end of the switch 90 is coupled to the power conversion circuit 30, and a second end is coupled to the power line 61 via the connector 80. The switch 90 is controlled by a switch control signal VC and is turned ON during a direct charging mode (for example but not limited to the direct charging mode between time points t0 and t6 in FIG. 5) for conducting the DC output power to charge the battery 20. In one embodiment, the charging control circuit (e.g. the charging control circuit 50 shown in FIG. 8) of the charging apparatus of the present invention further includes a switch control circuit 56, wherein the switch control circuit 56 determines whether to enter the direct charging mode according to the battery voltage VBATS or the DC output voltage VBUS. In one embodiment, the switch 90 of the charging apparatus of the present invention is OFF when the charging apparatus is not in the direct charging mode, and in this case the power conversion circuit 30 may be set to a normal power conversion mode. Under such circumstance, the DC output voltage VBUS may be for example but not limited to a USB standard voltage of 5V or 20V, and it can be irrelevant to the battery voltage VBATS. Under such circumstance, in one embodiment, the charging apparatus of the present invention may further include a mobile charging unit (not shown) which can convert the DC output voltage VBUS to generate a second output power (not shown) for charging or powering other devices.

Referring to FIGS. 4A and 5, the present invention provides a charging method for controlling a charging apparatus (for example but not limited to the charging apparatus 2) to charge a battery 20, wherein the charging apparatus includes a power conversion circuit 30. During charging operation, the battery 20 has a battery current IBAT and a battery voltage VBATS. The power conversion circuit 30 converts an input power VIN to a DC output power for charging a battery 20, wherein the DC output power includes a DC output voltage VBUS and a DC output current IDC. The charging control method includes steps of:

S1: controlling the power conversion circuit 30 to charge the battery 20 by the DC output current IDC as a constant charging current. The step S1 corresponds to, for example, the constant current charging from the time point t0 to t1 by the level of IDC1 as shown in FIG. 5.

S2: detecting the DC output voltage VBUS or the battery voltage VBATS; when the DC output voltage VBUS or the battery voltage VBATS rises to the first reference voltage threshold VTH1 (for example the time point t1 shown in FIG. 5), adjusting the DC output current IDC downward by a current down step ISTP1 such that the DC output current has an adjusted-down current level, and charging the battery 20 by the adjusted-down current level as a constant charging current (for example from the time point t1 to t2 shown in FIG. 5, the DC output current IDC is adjusted downward by a current down step ISTP1 from IDC1 to an adjusted-down current level IDC2).

S3: detecting the DC output voltage VBUS or the battery voltage VBATS; when the DC output voltage VBUS or the battery voltage VBATS drops to or lower than the second reference voltage threshold VTH2 (for example but not limited to about the time point t3 shown in FIG. 5), adjusting the DC output current IDC upward by a current up step ISTP2 such that the DC output current has an adjusted-up current level, and charging the battery 20 with the adjusted-up current level as a constant charging current (for example from time point t4 to t5 shown in FIG. 5, the DC output current IDC is adjusted upward by a current up step ISTP2 from IDC3 to an adjusted-up current level IDC4).

Depending on the charging conditions of the battery 20, the charging control method may repeat the aforementioned step S2 and/or S3 until the DC output current IDC is adjusted to be lower than a reference current threshold (for example but not limited to ITH or ITH+ISTP1 shown in FIGS. 4A and 5). Thereafter, the charging apparatus can leave the direct charging made, and the power conversion circuit 30 can charge the battery 20 by a constant voltage charging mode according to a constant target voltage (for example but not limited to the period after the time point t6 shown in FIG. 5).

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. As an example, charging the battery 20 with the direct charging mode and charging or powering other devices can be performed at the same time. Besides, the present invention is not limited to performing the constant voltage charging operation after the DC output current IDC is adjusted to be lower than a reference current threshold; the constant voltage charging operation can be performed at any time. Furthermore, those skilled in this art can readily conceive variations and modifications within the spirit of the present invention. For example, in the aforementioned embodiments, the charging control circuit generates the conversion control signal CTRL according to the battery voltage VBATS or the DC output current IDC for controlling the various operations of the power conversion circuit. However the conversion control signal CTRL also can be generated according to the DC output voltage VBUS or the battery current IBAT for controlling the power conversion circuit. As another example, to perform an action "according to" a certain signal as described in the context of the present invention is not limited to performing an action strictly according to the signal itself (for example but not limited to the DC output voltage VBUS, the battery voltage VBATS, the DC output current IDC, or the battery current IBAT in the aforementioned embodiments), but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A charging apparatus, configured to operably charge a battery, comprising:
    a power conversion circuit, configured to operably convert an input power to a DC (Direct Current) output power to charge the battery, wherein the DC output power includes a DC output voltage and a DC output current and the battery has a battery voltage; and
    a charging control circuit, including:
        a first comparison circuit, configured to operably compare the DC output voltage or the battery voltage with a first reference voltage threshold to generate a first comparison result;
        a second comparison circuit, configured to operably compare the DC output voltage or the battery voltage with a second reference voltage threshold to generate a second comparison result; and
        a conversion control circuit, configured to operably generate a conversion control signal for controlling the power conversion circuit to charge the battery with the DC output current;
    wherein in accordance with the first comparison result, when the battery voltage rises to the first reference voltage threshold, the conversion control circuit controls the power conversion circuit to adjust the DC output current downward by a current down step such that the DC output current has an adjusted-down current level and to charge the battery by the adjusted-down current level as a constant charging current;
    wherein in accordance with the second comparison result, when the battery voltage falls to the second reference voltage threshold, the conversion control circuit controls the power conversion circuit to adjust the DC output current upward by a current up step such that the DC output current has an adjusted-up current level and to charge the battery by the adjusted-up current level as a constant charging current.

2. The charging apparatus of claim 1, wherein the charging control circuit further includes a third comparison circuit configured to operably compare the DC output current with a reference current threshold to generate a third comparison result;
    wherein in accordance with the third comparison result, when the DC output current is adjusted to be lower than the reference current threshold, the conversion control circuit controls the power conversion circuit to charge the battery by a constant voltage charging mode according to a constant target voltage.

3. The charging apparatus of claim 1, wherein the charging control circuit further includes a current step determining circuit which determines the current up step according to a difference between the output voltage or the battery voltage and the second reference voltage threshold.

4. The charging apparatus of claim 1, wherein the charging control circuit further includes a current step determining circuit which determines the current up step according to a load current.

5. The charging apparatus of claim 1, wherein the charging control circuit further includes a current step determining circuit which determines the current up step according to a battery current.

6. The charging apparatus of claim 1, wherein the current up step is not larger than the current down step.

7. The charging apparatus of claim 1, further including:
    a cable configured to be coupled to the power conversion circuit, wherein the cable has a power line configured to be coupled to the DC output power; and
    a first connector, configured to couple the battery to the power line.

8. The charging apparatus of claim 7, further including:
    a second connector, configured to couple the DC output power to power line.

9. The charging apparatus of claim 7, further including:
    a switch, configured to operably control the conduction between the DC output power and the power line;
    wherein the charge control circuit further includes a switch control circuit which controls the switch to be ON during a direct charging mode for conducting the DC output power to charge the battery.

10. The charging apparatus of claim 9, wherein the switch control circuit determines whether to enter the direct charging mode according to the battery voltage or the DC output voltage.

11. The charging apparatus of claim 8, wherein
    the cable is a USB (Universal Serial Bus) or USB PD (Universal Serial Bus Power Delivery) cable; and
    the first connector and the second connector are USB or USB PD connectors.

12. A charging control circuit, configured to operably control a charging apparatus, wherein the charging apparatus comprises: a power conversion circuit, configured to operably convert an input power to a DC (Direct Current) output power to charge the battery, wherein the DC output power includes a DC output voltage and a DC output current and the battery has a battery voltage; the charging control circuit includes:
- a first comparison circuit, configured to operably compare the DC output voltage or the battery voltage with a first reference voltage threshold to generate a first comparison result;
- a second comparison circuit, configured to operably compare the DC output voltage or the battery voltage with a second reference voltage threshold to generate a second comparison result; and
- a conversion control circuit, configured to operably generate a conversion control signal for controlling the power conversion circuit to charge the battery with the DC output current;
- wherein in accordance with the first comparison result, when the battery voltage rises to the first reference voltage threshold, the conversion control circuit controls the power conversion circuit to adjust the DC output current downward by a current down step such that the DC output current has an adjusted-down current level and to charge the battery by the adjusted-down current level as a constant charging current;
- wherein in accordance with the second comparison result, when the battery voltage falls to the second reference voltage threshold, the conversion control circuit controls the power conversion circuit to adjust the DC output current upward by a current up step such that the DC output current has an adjusted-up current level and to charge the battery by the adjusted-up current level as a constant charging current.

13. The charging control circuit of claim 12, further including a third comparison circuit configured to operably compare the DC output current with a reference current threshold to generate a third comparison result;
- wherein in accordance with the third comparison result, when the DC output current is adjusted to be lower than the reference current threshold, the conversion control circuit controls the power conversion circuit to charge the battery by a constant voltage charging mode according to a constant target voltage.

14. The charging control circuit of claim 12, further including a current step determining circuit which determines the current up step according to a difference between the output voltage or the battery voltage and the second reference voltage threshold.

15. The charging control circuit of claim 12, further including a current step determining circuit which determines the current up step according to a load current.

16. The charging control circuit of claim 12, further including a current step determining circuit which determines the current up step according to a battery current.

17. The charging control circuit of claim 12, wherein the current up step is not larger than the current down step.

18. The charging control circuit of claim 12, wherein the charging apparatus further includes:
- a switch, configured to operably control the conduction between the DC output power and a power line;
- wherein the charge control circuit further includes a switch control circuit which controls the switch to be ON during a direct charging mode for conducting the DC output power to charge the battery.

19. The charging control circuit of claim 18, wherein the switch control circuit determines whether to enter the direct charging mode according to the battery voltage or the DC output voltage.

* * * * *